(12) United States Patent
Andersson et al.

(10) Patent No.: US 7,632,046 B2
(45) Date of Patent: Dec. 15, 2009

(54) TURNING TOOL, AND A BASIC BODY AND A SHIM PLATE FOR A TURNING TOOL (75) Inventors: Claes Andersson, Valbo (SE); Gunnar Jansson, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 139 days.

(21) Appl. No.: 11/984,069

(22) Filed: Nov. 13, 2007

(65) Prior Publication Data

US 2008/0152441 A1 Jun. 26, 2008

(30) Foreign Application Priority Data

Dec. 21, 2006 (SE) .................................... 0602808

(51) Int. Cl.
*B23B 27/00* (2006.01)
*B23B 27/16* (2006.01)
(52) U.S. Cl. .............................. 407/46; 407/66; 407/113
(58) Field of Classification Search .................... 407/66, 407/67, 113–116, 104, 105, 46, 47
See application file for complete search history.

(56) References Cited

U.S. PATENT DOCUMENTS 3,124,866 A * 3/1964 Novkov .......................... 407/4

(Continued)

FOREIGN PATENT DOCUMENTS

| DE | 24 43 756 | 4/1976 |
|----|-----------|--------|
| DE | 38 18 970 C1 | 11/1989 |
| EP | 0 119 175 | 12/1986 |
| EP | 0 178 273 | 8/1989 |
| EP | 1 500 452 A1 | 1/2005 |
| WO | WO 97/11806 | 4/1997 |

*Primary Examiner*—Will Fridie, Jr.
(74) *Attorney, Agent, or Firm*—Drinker Biddle & Reath LLP (57) ABSTRACT

A turning tool including a basic body having a pocket, a shim plate mounted in the pocket, and an indexable turning insert mounted in the pocket. The pocket opens in a front surface and in a side surface of the basic body, and accommodates two spaces spaced-apart level-wise, a lower space housing the shim plate and delimited by a bottom surface and two side support surfaces, which form an acute angle with each other, one of which is a primary side support surface and the other one a secondary side support surface, and an upper space housing the turning insert. The shim plate includes an upperside and an underside between which a pair of primary and secondary contact surfaces extend, which form an acute angle with each other and are urged against the primary and secondary side support surfaces in the pocket, as well as a pair of inactive surfaces extend in the form of an outer end surface and an outer side limiting surface, which together delimit a supporting corner section of the shim plate. The turning insert has a triangular basic shape and includes an upperside, an underside resting against the upperside of the shim plate, and three side surfaces that are situated in a first imaginary, equilateral triangle and therefore converge in pairs at an angle of 60° toward corners in which cutting edges are included. First and second tightening elements are arranged to detachably fix the shim plate and the turning insert individually. The secondary side support surface of the pocket is formed on a lug having a top surface situated under the turning insert. Respective acute angles ($\epsilon$, $\gamma$) between the primary and secondary side support surfaces of the pocket, and the primary and secondary contact surfaces of the shim plate, are smaller than 60°. The underside of the turning insert and the upperside of the shim plate are engaged with each other via an interface that includes female-like and male-like engagement members, which are in engagement with each other to prevent turning of the turning insert.

19 Claims, 9 Drawing Sheets

U.S. PATENT DOCUMENTS

| | | | |
|---|---|---|---|
| 4,674,924 A * | 6/1987 | Carlsson et al. | 407/114 |
| 5,738,468 A | 4/1998 | Boianjiu | |
| 5,810,518 A * | 9/1998 | Wiman et al. | 407/102 |
| 5,820,310 A | 10/1998 | Boianjiu | |
| 5,888,029 A * | 3/1999 | Boianjiu | 407/66 |
| 6,343,898 B1 * | 2/2002 | Sjoo et al. | 407/101 |
| 6,733,215 B2 * | 5/2004 | Isaksson | 407/114 |
| 7,387,474 B2 * | 6/2008 | Edler et al. | 407/113 |
| 2003/0156910 A1 * | 8/2003 | Friedman et al. | 407/117 |
| 2006/0216121 A1 * | 9/2006 | Edler et al. | 407/104 |

\* cited by examiner

TURNING TOOL, AND A BASIC BODY AND A SHIM PLATE FOR A TURNING TOOL

This application claims priority under 35 U.S.C. §119 to Swedish Patent Application No. 0602808-8, filed on Dec. 21, 2006, the disclosure of which is incorporated by reference herein in its entirety.

FIELD OF THE INVENTION

The present invention relates generally to a turning tool for chip removing machining of the type that includes a basic body having a pocket in which a shim plate and an indexable turning insert are mounted. The pocket opens in a front surface and a side surface of the basic body, and accommodates two spaces spaced-apart level-wise, a lower one of which houses the shim plate and is delimited by a bottom surface and two side support surfaces, which form an acute angle with each other, and one of which is a primary side support surface and the other one a secondary side support surface, while an upper space houses the turning insert. The shim plate includes an upperside and an underside between which a number of side surfaces extend, viz. a pair of primary and secondary contact surfaces, which form an acute angle with each other and are urged against the primary and secondary side support surfaces in the pocket, as well as a pair of inactive surfaces in the form of an outer end surface and an outer side limiting surface, which together delimit a supporting corner section of the plate. The turning insert has a triangular basic shape and includes an upperside, an underside resting against the upperside of the shim plate, and three side surfaces that are situated in an imaginary, equilateral triangle and therefore converge in pairs at an angle of 60° toward corners in which cutting edges are included. First and second tightening elements are arranged to detachably fix the shim plate and the turning insert individually.

Turning tools of the type generally mentioned above can be used for miscellaneous turning operations in which metallic workpieces in particular are formed by chip removing machining. The triangular turning inserts included in the tool can be divided into two main categories, viz. turning inserts having round corners or noses, for instance, for longitudinal turning, profile turning, and face turning, as well as turning inserts having teeth placed in corners for chasing threads. The problems that the invention aims at solving have been observed in connection with tools for the thread turning. However, the fundamental problems as well as the solution according to the invention are generally applicable to all kinds of turning by triangular turning inserts.

BACKGROUND OF THE INVENTION

The known turning tool shown in FIGS. 1-5, includes a basic body 1, in the form of a so-called shaft holder, a turning insert 2 for chasing threads, a shim plate 3 for the turning insert, as well as two tightening elements 4, 5 for individual clamping of the turning insert and the shim plate. In order to house the turning insert and the shim plate, a pocket, in its entirety designated 6, is formed in the basic body 1 and opens in a front surface 7 as well as in a side surface 8 of a front head 9, which at the rear transforms into a thinner shaft 10 having a polygonal cross-section shape.

The pocket 6 accommodates two spaces spaced-apart level-wise, a lower one of which has the purpose of housing the shim plate 3, and is delimited by a plane bottom surface 11 as well as by two side support surfaces 12, 13 (see FIGS. 2 and 3), which suitably are plane. Among the side support surfaces, the surface 12 is longest and forms a primary side support surface, while the other one is comparatively short and forms a secondary side support surface 13. As is seen from the end borderlines 14 in FIG. 2, the surfaces 12, 13 are inclined in the upward/inward direction in relation to the bottom surface 11, the angle between the individual side support surface and the bottom surface being acute, e.g. within the range of 87-89.5°. The side support surfaces 12, 13 are delimited upward by straight borderlines 15, which run parallel to the bottom surface 11.

Figure 2:
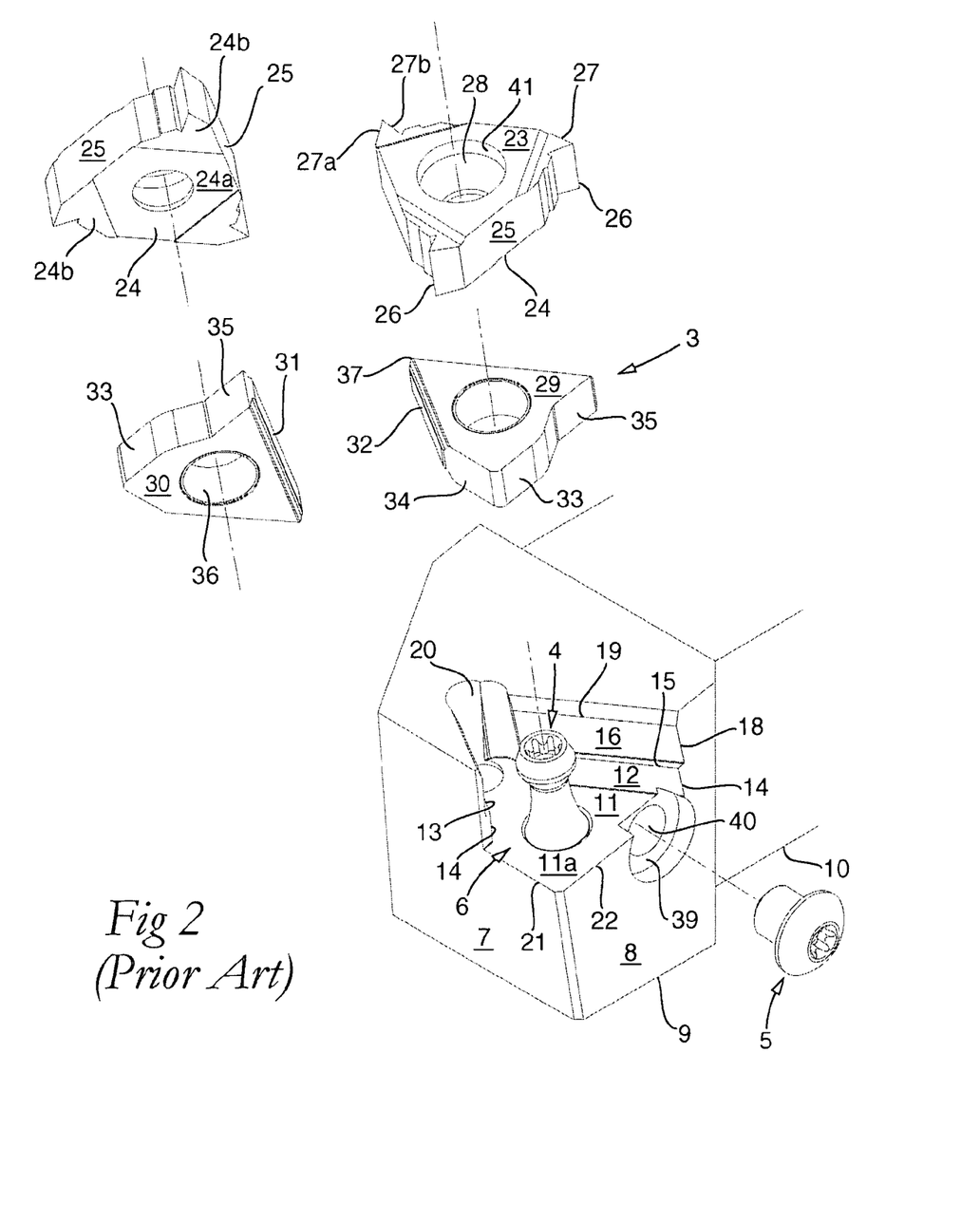
FIG. 2 is a perspective exploded view of the tool in FIG. 1, a turning insert and a shim plate for the same being shown spaced-apart from the basic body of the tool, more precisely in a top perspective view as well as in a bottom perspective view.
Figure 3:
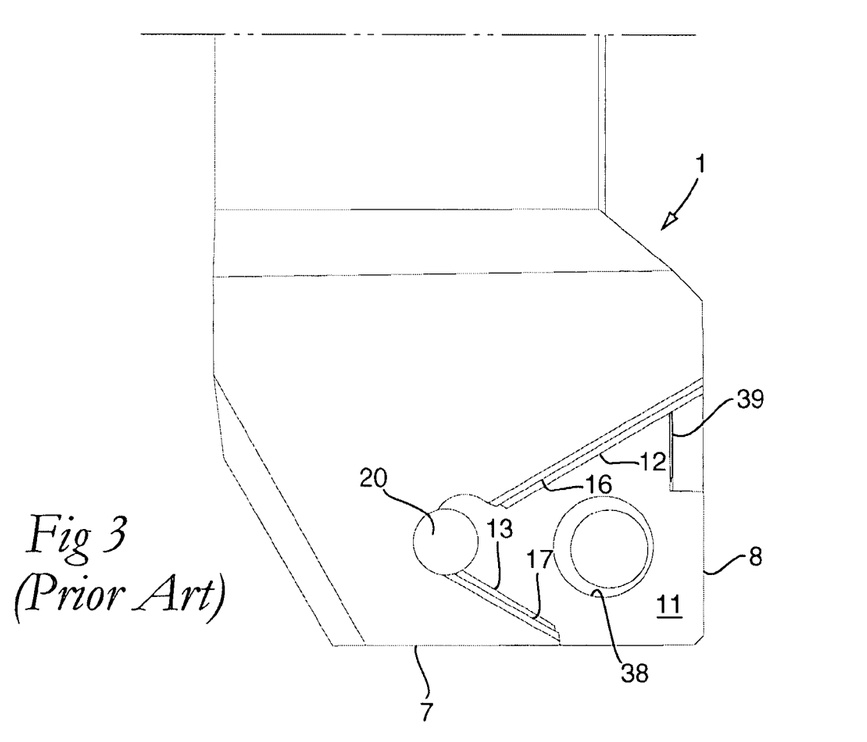
FIG. 3 is a planar view from above of a pocket formed in the basic body for the shim plate and the turning insert.
Figure 4:
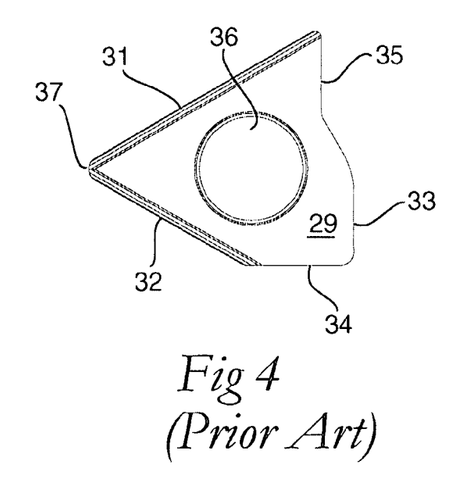
FIG. 4 is a planar view from above of the shim plate.
Figure 5:
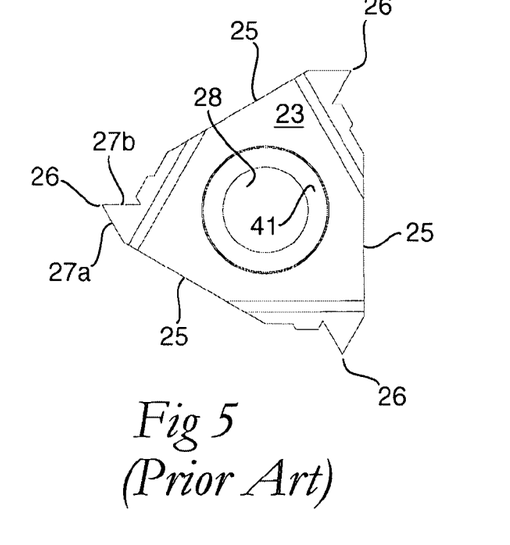
FIG. 5 is a planar view from above of the turning insert.
Figure 6:
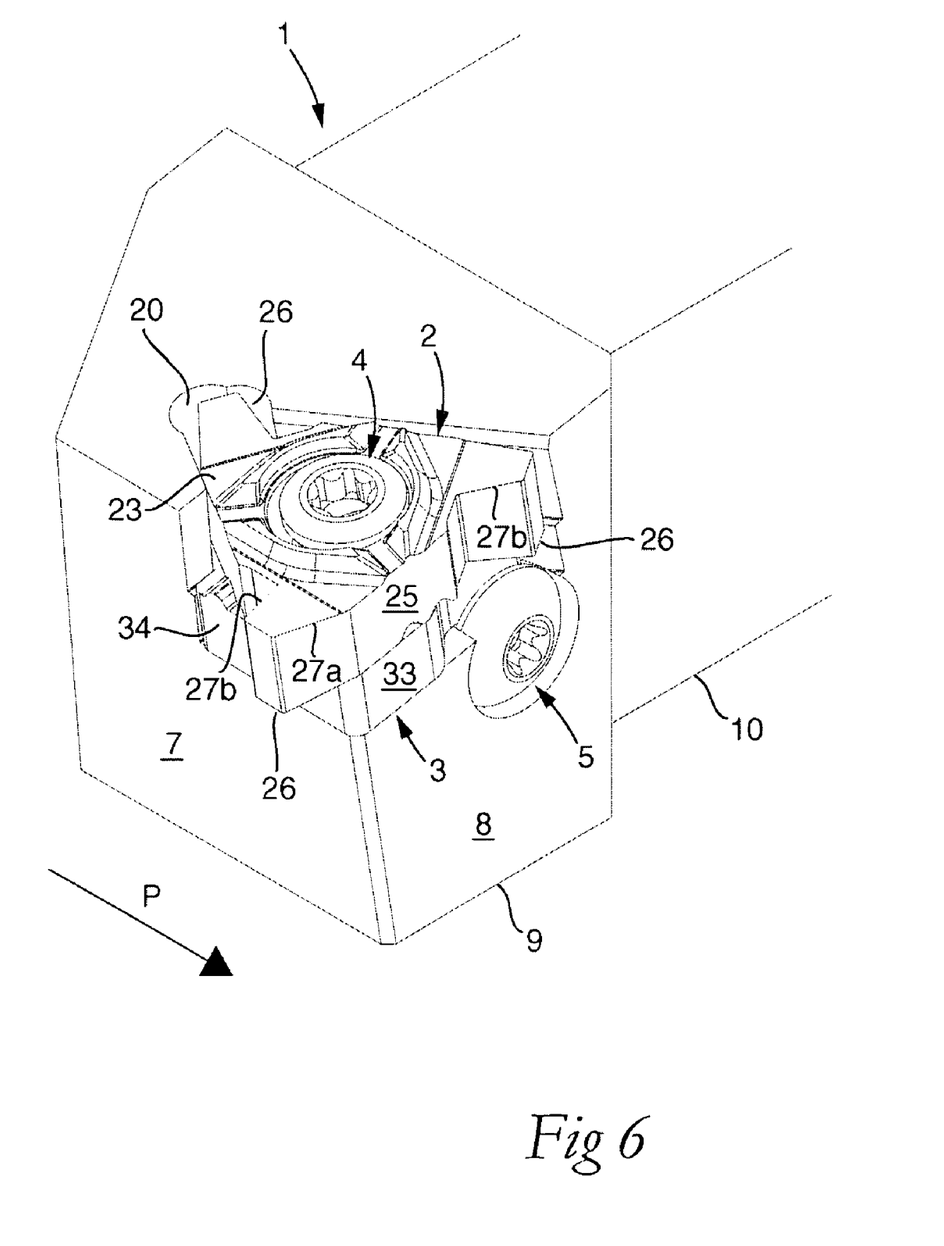
FIG. 6 is a perspective view corresponding to FIG. 1 and showing the tool according to an embodiment of the invention.

The upper space for the turning insert 2 is delimited by two upper side support surfaces 16, 17 against which the turning insert is urgable, and which are inclined in the direction inward/upward like the lower side support surfaces (see the end borderline 18 in FIG. 2). Each upper side support surface is delimited upward by a borderline 19, which runs parallel to the bottom surface 11. All side support surfaces 12, 13, 16, 17 converge into a widened clearance space, designated 20, in the interior of the pocket. An outer corner section 11a of the bottom surface 11 is delimited by two borderlines 21, 22, which extend at approximately a right angle to each other and form transitions to the front and side surfaces 7, 8 of the basic body.

The turning insert 2 has a triangular basic shape and comprises an upperside 23 and an underside 24, between which there are extending three side surfaces 25 that in this case are homologous and situated in an imaginary, equilateral triangle and therefore converge in pairs at an angle of 60° toward three corners. In this case, the underside 24 of the turning insert is formed with a central, hexagonal part surface 24a, which is countersunk in relation to three plane, foot-like part surfaces 24b at the corners of the turning insert. In each corner, a tooth 26 is formed having a cutting edge 27, which in the embodiment shown is acute and includes two V-shapedly converging part or flank edges 27a, 27b. Furthermore, in this case the turning insert is formed with a through hole 28 for the tightening screw 4.

The shim plate 3 includes an upperside 29 and an underside 30 between which a number of side surfaces extend, viz. a pair of primary and secondary contact surfaces 31, 32 (see also FIG. 4), which are active so far that they can be urged against the primary and secondary side support surfaces 12, 13 in the pocket 6, as well as a pair of inactive surfaces in the form of an outer end surface 33 and an outer side limiting surface 34, which together delimit a corner section located above the free, outer corner section 11a of the bottom surface 11. In this case, the end surface 33 transforms into a countersunk shoulder surface 35 against which the head of the tightening screw 5 is urgable. The shim plate 3 also includes a through hole 36 for the screw 4. The two contact surfaces 31, 32 converge into a marked tip 37.

In the bottom surface 11 (see FIG. 3), a hole 38 mouths in which a female thread is formed for the co-operation with the male thread of the screw 4. In the side surface 8 of the basic body 1, a seat having a bottom surface 39 is countersunk, in which bottom surface a hole 40 having a female thread mouths. The bottom surface 39 forms a stop for the head of the screw so far that it makes further tightening of the screw impossible if the head would reach up to the same.

A characteristic feature for the known tool is that the two side contact surfaces 31, 32 of the shim plate 3 converge toward the common tip 37 at the same convergence angle as the side surfaces 25 of the turning insert, i.e., 60°. For this reason, the individual lower side support surface 12, 13 (see FIG. 3) is parallel to the respective side support surface 16, 17 of the turning insert. In other words, the shim plate 3 is wedged up between the lower side support surfaces 12, 13 in the same way as the turning insert is wedged up between the upper side support surfaces 16, 17. The clamping of the shim plate is provided by the screw 5, while the clamping of the turning insert is effected by the screw 4. In order to fulfill this task, in this case the screw 4 is tiltable (via cone surfaces, not shown, down in the hole 38), so that the same, upon final tightening, is tilted inward toward the clearance space 20, the conical head of the screw, which is smaller than the hole 28, being urged against the cone surface 41 in the hole 28 (see FIG. 2) to apply an inwardly directed force to the turning insert. The tightening screw 4 in question also has the advantage that the same allows removal of the turning insert without being unscrewed out of the hole 38. By the tiltability thereof, the screw can be tilted outward after having been unscrewed some thread turns without loosing the engagement with the female thread, whereby the head of the screw can freely pass through the hole 28 of the turning insert.

Figure 1:
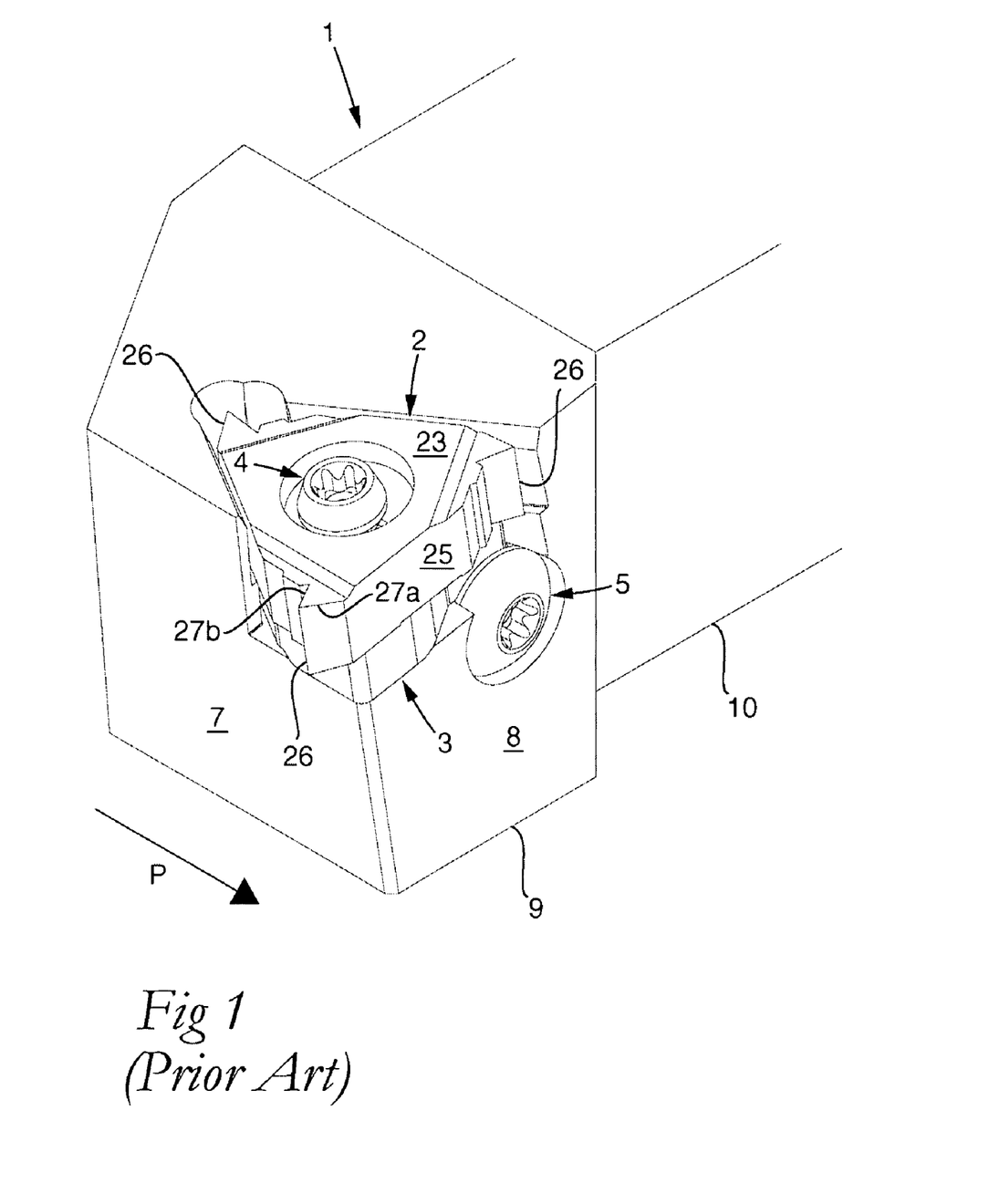
FIG. 1 is a partial perspective view of a related art, commercially available turning tool for thread turning, the tool being shown in a complete, assembled state.

In FIG. 1, the arrow P indicates the feeding direction of the tool during chasing. When the active cutting tooth 26 enters into the workpiece at the entrance of the thread to be made, the workpiece is first entered by the part edge 27*a*, a force being applied to the turning insert, which force aims to turn the same clockwise around the tightening screw 4. As soon as also the second part edge 27*b* also has entered the workpiece so that a full thread is turned, the cutting forces on the two part edges will become essentially equally large. When the cutting tooth finally leaves the workpiece, the part edge 27*a* is detached before the part edge 27*b*. This means that the interaction of forces is inverted so far that a force is applied to the turning insert, via the part edge 27*b*, which aims to turn the insert counter-clockwise around the screw 4.

A disadvantage of the known tool construction is that the fixation of the turning insert may become unstable and unreliable, among other things as a consequence of the fact that the only active structure that, besides the tightening screw, counteracts turning of the turning insert is the two upper, converging side support surfaces in the pocket. Thus, the underside of the turning insert and the upperside of the shim plate are plane and smooth, and therefore they lack the capability of locking the turning insert. Considering the rule that small convergence angles gives a good wedging effect, and vice versa, the convergence angle of 60° of the side surfaces of the turning insert is furthermore comparatively large. Even if the stability problems are moderate at the entering of the turning insert into the workpiece, as the cutting forces aim to turn the turning insert in such a way that the forces essentially are carried by the primary, long side support surface, the problems become marked when the turning insert leaves the workpiece and is subjected to forces that primarily are to be carried by the short, secondary side support surface. In the latter case, the risk is large that the short contact surface of the turning insert slides along the co-operating, secondary side support surface during tensioning of the tightening screw and dislodging of the turning insert.

If the turning insert on and off is dislodged from the desired, predetermined position thereof, the result becomes an impaired dimensional accuracy of the thread turned. Moreover, in polar cases, breakdowns may occur.

In this connection, the use of shim plates in thread-chasing tools is conditioned by the need to vary the tilt angle of the cutting tooth in relation to the workpiece, e.g., when threads having different pitches and diameters, respectively, are to be turned. Therefore, instead of holding in stock a great number of turning inserts having different tooth angles, in practice use is made of a universal type of turning inserts that is combined with different shim plates, which by having different angles between the uppersides and undersides thereof, offer the possibility of altering the tilt angle of the tooth in relation to the basic body (in practice, the tilt-angle variations are about a few degrees).

Related art thread-chasing tools having triangular turning inserts are disclosed in, for instance, European patent documents EP 0119175 and EP 0178273. However, in these cases, the tools lack shim plates.

As disclosed in U.S. Pat. No. 5,810,518, there is a turning tool for, among other things, thread turning that makes use of a triangular turning insert, which is mounted on the basic body via a shim plate. However, in this case, the shim plate is locked in relation to the basic body as well as the turning insert via serration surfaces, which individually include a plurality of ridges and grooves, and furthermore, support for the side surfaces of the turning insert are lacking. For these reasons, the manufacture of the tool is complicated at the same time as the risk of form defects in the turning insert as well as the shim plate may give rise to poor machining precision of the tool.

The present invention aims at obviating the above-mentioned shortcomings of previously known turning tools and at providing an improved turning tool of the type that makes use of shim plates to determine the tilt angle of the cutting tooth. Therefore, an object of the invention is to provide a tool, the turning insert of which is kept stably fixed in the desired, predetermined position thereof also under varying stresses on the insert.

Another object of the invention is to provide the improved stability using simple and few ways, which guarantees a continued simple and cost-effective manufacture of the turning insert as well as of the shim plate. Among other things, the requirements of precision when forming the pocket in the basic body should be moderate.

Yet another object of the invention is to increase the freedom of the designer to form space-requiring teeth having a complicated shape at the corners of the turning insert, more precisely by shortening of the side surfaces of the turning insert.

SUMMARY OF THE INVENTION

In an embodiment, the invention provides a turning tool including a basic body having a pocket, a shim plate mounted in the pocket, and an indexable turning insert mounted in the pocket. The pocket opens in a front surface and in a side surface of the basic body, and accommodates two spaces spaced-apart level-wise, a lower space housing the shim plate and delimited by a bottom surface and two side support surfaces, which form an acute angle with each other, one of which is a primary side support surface and the other one a secondary side support surface, and an upper space housing the turning insert. The shim plate includes an upperside and an underside between which a pair of primary and secondary contact surfaces extend, which form an acute angle with each other and are urged against the primary and secondary side support surfaces in the pocket, as well as a pair of inactive surfaces extend in the form of an outer end surface and an outer side limiting surface, which together delimit a supporting corner section of the shim plate. The turning insert has a triangular basic shape and includes an upperside, an underside resting against the upperside of the shim plate, and three side surfaces that are situated in a first imaginary, equilateral triangle and therefore converge in pairs at an angle of 60° toward corners in which cutting edges are included. First and second tightening elements are arranged to detachably fix the shim plate and the turning insert individually. The secondary side support surface of the pocket is formed on a lug having a top surface situated under the turning insert. Respective acute angles (ε, γ) between the primary and secondary side support surfaces of the pocket, and the primary and secondary contact surfaces of the shim plate, are smaller than 60°. The underside of the turning insert and the upperside of the shim plate are engaged with each other via an interface that includes female-like and male-like engagement members, which are in engagement with each other to prevent turning of the turning insert.

In another embodiment, the invention provides a basic body for turning tools, including a pocket opening in a front surface and in a side surface of the basic body, and accommodating two spaces spaced-apart level-wise. A lower space is for receiving a shim plate, and is delimited by a bottom surface and two side support surfaces, which form an acute angle with each other, one of which forms a primary side support surface and the other one a secondary side support surface. An upper space is for receiving an indexable turning insert. The indexable turning insert has a triangular basic shape including three side surfaces, which converge in pairs at an angle of 60° toward corners, wherein the secondary side support surface is formed on a lug having a top surface situated under the upper space for the turning insert, an acute angle (ε) between the primary and secondary side support surfaces being smaller than 60°.

In yet another embodiment, the invention provides a shim plate for turning tools, including an upperside and an underside between which a pair of primary and secondary contact surfaces extend, which form an acute angle with each other, as well as a pair of inactive side surfaces extend in the form of an outer end surface and an outer side limiting surface, which together delimit a supporting corner section, wherein an acute angle (γ) between the two contact surfaces is smaller than 60°.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

The parts of the new tool according to FIGS. 6-14 having the counterpart thereof in the related art tool according to FIGS. 1-5 have been given the same reference designations as in FIGS. 1-5, and are not described in more detail below.

Generally, the turning inserts of the tool are manufactured from cemented carbide or another hard and wear-resistant material, while the basic body is manufactured from steel or the like. The shim plate may also advantageously be manufactured from cemented carbide, although steel is also possible as a material. When the turning insert and the shim plate are manufactured from cemented carbide, the same may be ground as well as directly pressed, i.e., unground. It is also possible to grind the turning insert and leave the shim plate unground, or vice versa.

The invention is based on a combination of two principal measures, one of which includes connecting the turning insert with the shim plate via an interface that includes female-like and male-like engagement members, which are in engagement with each other to prevent turning of the turning insert in relation to the shim plate. The other measure includes fixing the shim plate in the pocket in such a way that the shim plate resists the cutting forces that are transferred to the shim plate via the interface, without being dislodged from the desired position thereof.

In an embodiment of the tool according to the invention shown in FIGS. 6-14, the interface between the turning insert 2 and the shim plate 3 includes a single active engagement member in the shim plate and three alternately usable engagement members in the turning insert. More precisely, in this case the male member of the interface is a straight ridge 42 that projects up from the upperside 29 of the shim plate, while female-like engagement members in the turning insert are straight grooves 43 in the underside of the turning insert.

Figure 7:
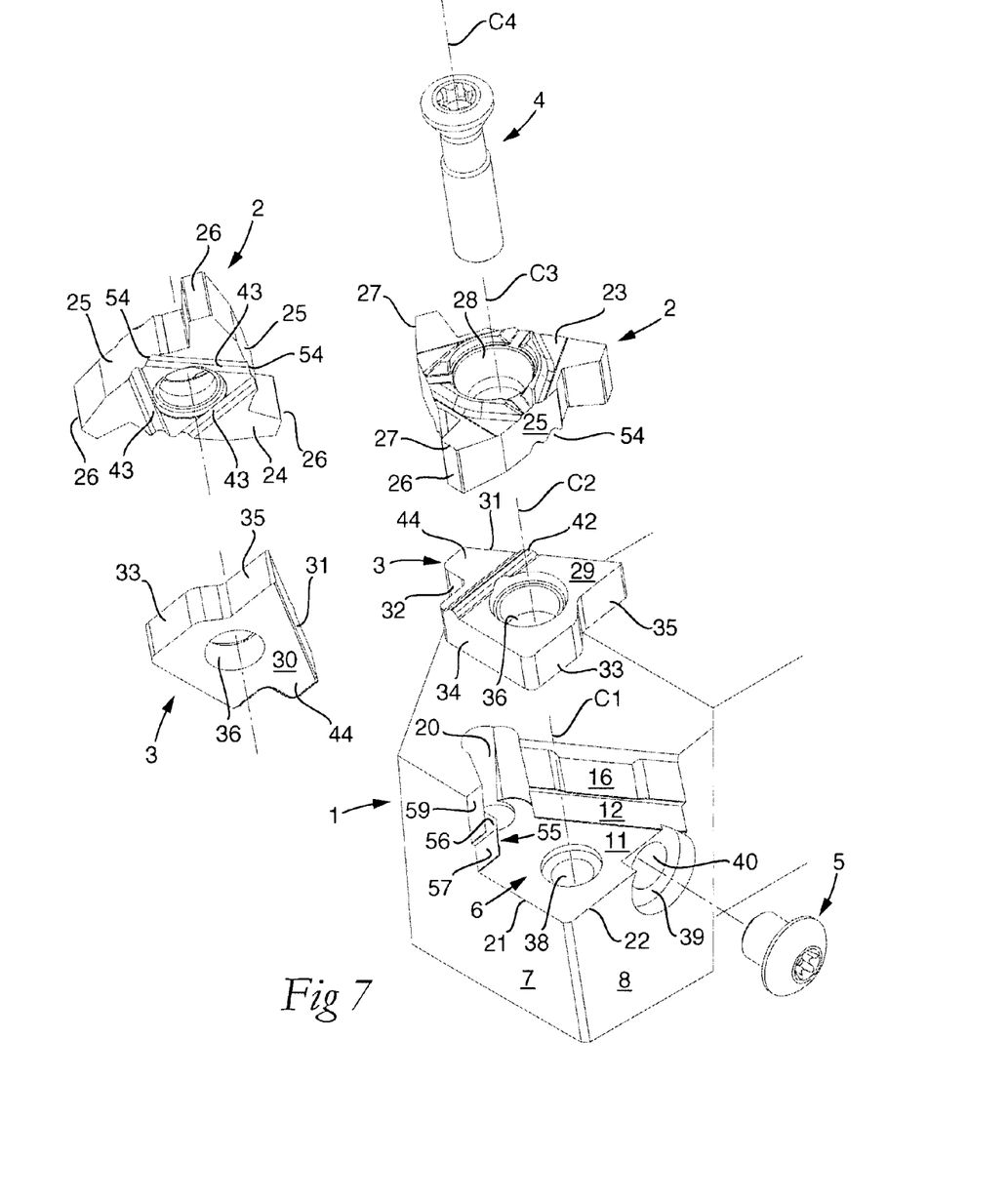
FIG. 7 is a perspective exploded view corresponding to FIG. 2 and showing the turning insert, shim plate and tightening screws of the tool spaced-apart from the basic body thereof.
Figure 8:
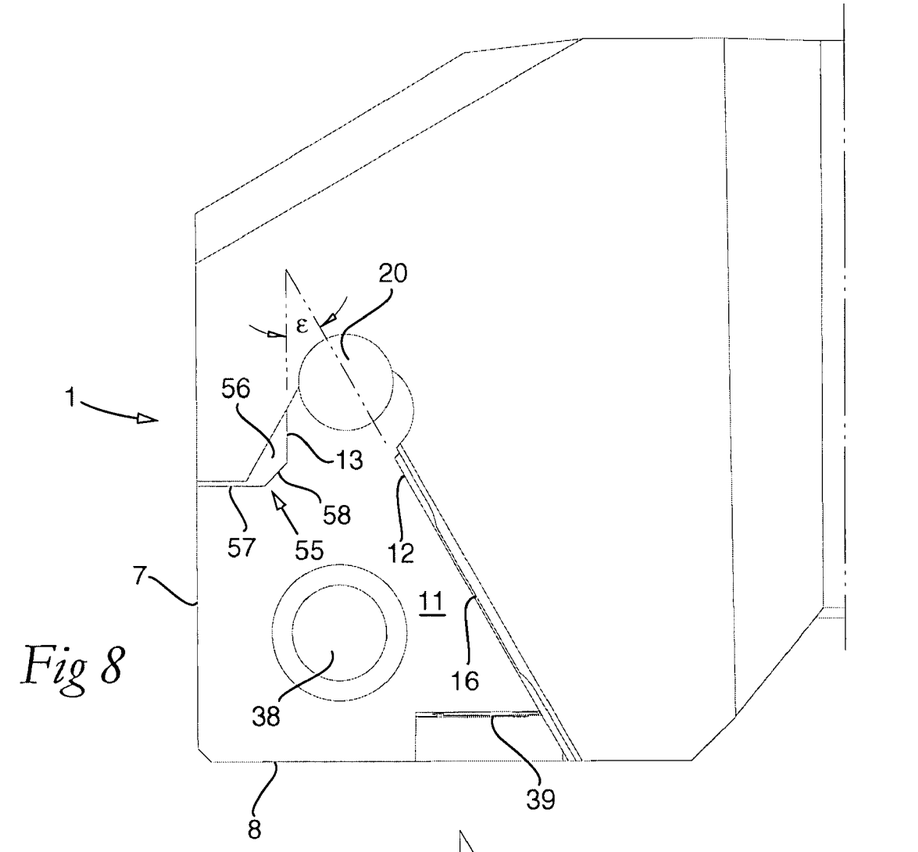
FIG. 8 is an enlarged planar view showing the pocket in the basic body.

In FIG. 7, the center axis of the threaded hole 38 is designated C1 and the corresponding center axes of the hole 36 in the shim plate, of the hole 28 in the turning insert, as well as of the tightening screw 4 are designated C2, C3 and C4, respectively.

Figure 11:
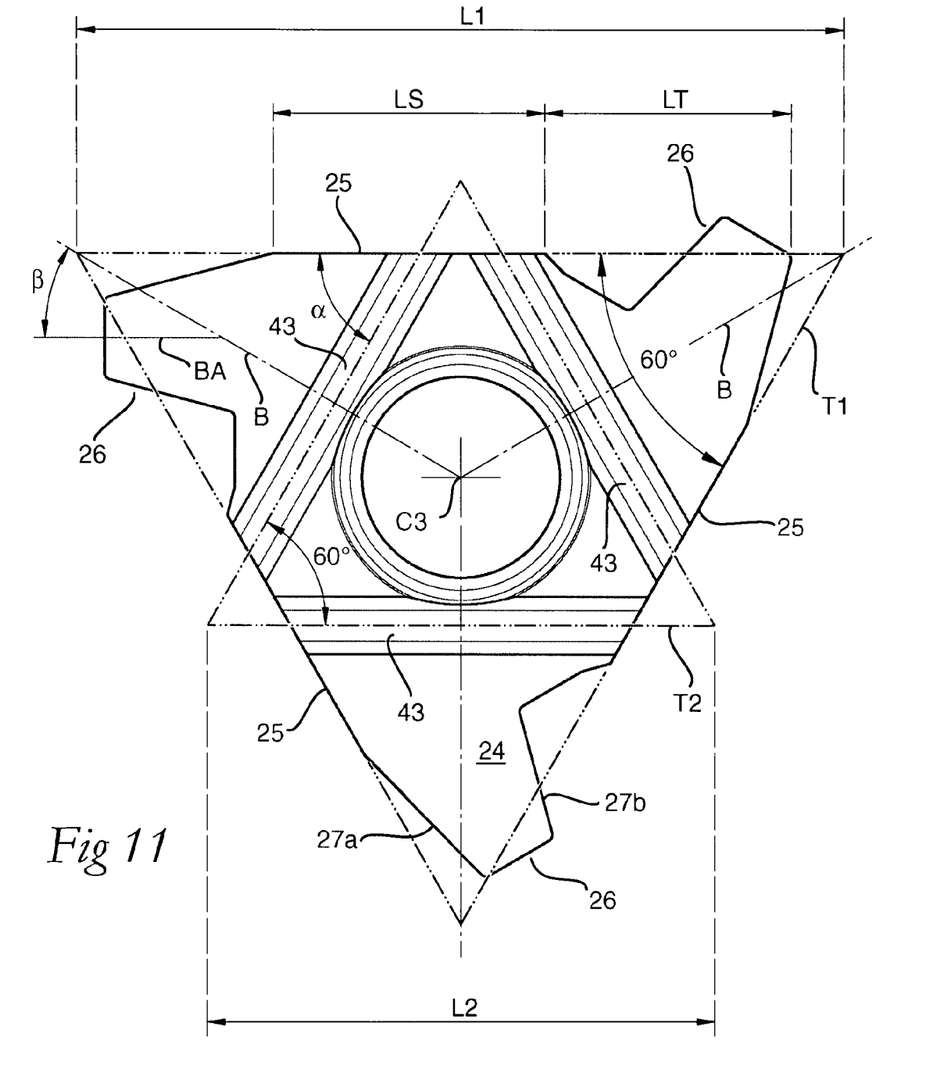
FIG. 11 is an enlarged planar view from below of the turning insert.

Reference is now made to FIG. 11, which in enlargement illustrates the underside 24 of the turning insert 2. In respect of geometry, the side surfaces 25 of the turning insert are situated or inscribed in an imaginary triangle T1, the sides or legs of which converge at 60° toward corners intersected by bisectors B. The grooves 43 are also situated in an imaginary triangle T2 having an equilateral shape. Triangle T2 is smaller than triangle T1 and rotated in relation to the same around the common center of the triangles, which is defined by the center axis C3. More precisely, the triangles are rotated in such a way that the individual leg of the triangle T2 intersects the individual leg of the triangle T1 at an acute angle a, which in this case amounts to 60° (involving that the groove 43, in this case, extends perpendicularly to the bisector B). However, the angle of rotation a may vary upward as well as downward from 60°, more precisely within the interval of 50-90°. The angle α in question relates to the groove 43 that intersects the active side surface 25 that is diametrically opposite an active cutting tooth 26. The individual cutting tooth 26 is inclined in relation to the bisector B. More precisely, a bisector BA between the part edges 27a, 27b forms an angle β with the bisector B. The angle β is acute and may vary within the range of 0-45°. In the example, β amounts to 30°.

In FIG. 11, LS designates the length of the side surface 25 along the individual leg of the triangle T1, while LT designates the length of the space occupied by the individual cutting tooth 26. In the example, LS and LT are approximately equally large, and each occupies only about ⅓ of the entire length L1 of the triangle leg. Suitably, LS should amount to at most 50% of L1.

Figure 9:
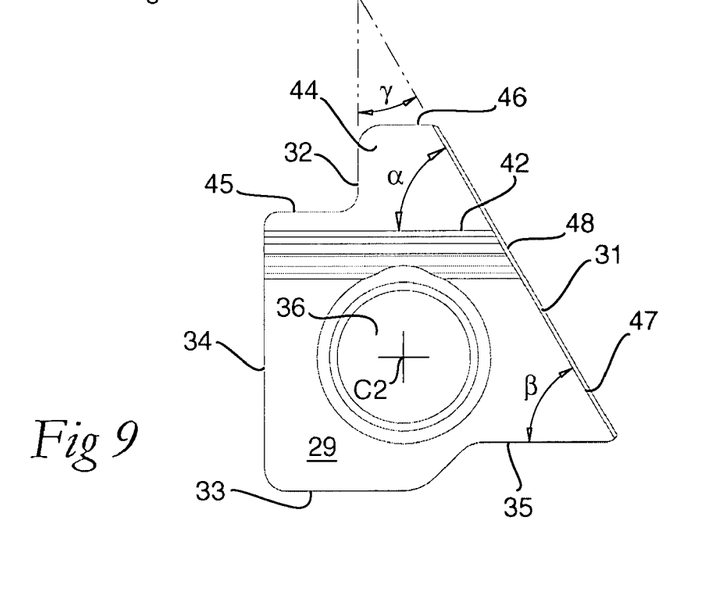
FIG. 9 is a planar view from above of the shim plate.
Figure 10:
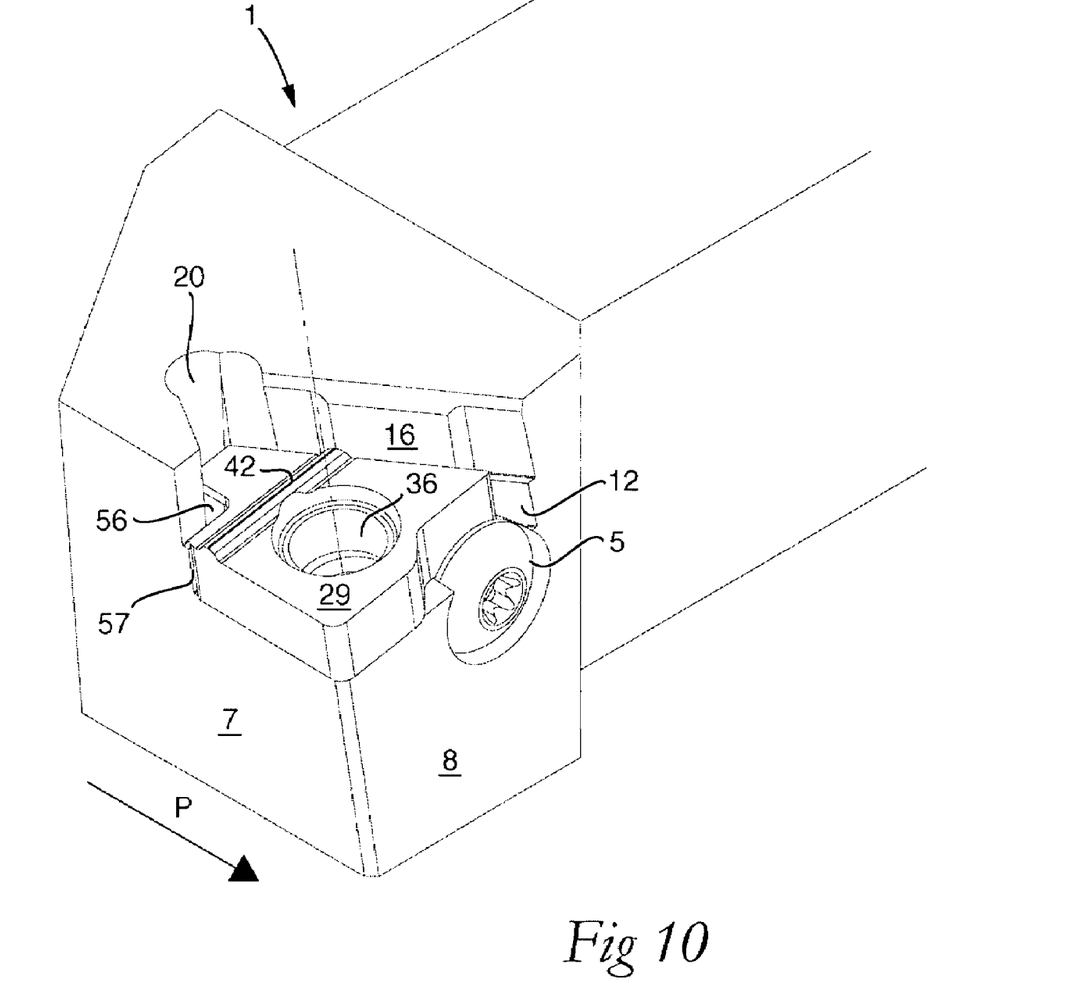
FIG. 10 is a perspective view showing the shim plate mounted in the pocket.

In FIG. 9, it is seen that the ridge 42 extends at the same angle α to the primary contact surface 31 of the shim plate as the groove 43 to the side surface 25 of the turning insert. In other words, the ridge 42 in the example extends at 60° to the contact surface 31.

With continued reference to FIG. 9, the angle γ between the primary contact surface 31 and the secondary contact surface 32 is smaller than 60°. In such a way, a nose 44 is formed at the inner end of the shim plate 3, which can be wedged up considerably more efficient than the 60° corner of the related art shim plate. The secondary contact surface 32 is spaced-apart from the outer side limiting surface 34 of the shim plate via a transition surface 45, which advantageously may extend at a right or possibly obtuse angle to the side limiting surface 34. Between the two contact surfaces 31, 32, an inner end surface 46 extends, which forms an obtuse angle with the contact surface 31. By the existence of the end surface 46, the nose 44 obtains a truncated shape contrary to the pointed corner shape of the related art shim plate. In practice, the acute angle γ should amount to at least 25° and at most 50°. In the example, γ=30°.

As is seen by the fact that the upper and lower borderlines 47, 48 of the contact surface 31 are simultaneously visible in the planar view according to FIG. 9, the contact surface 31 is inclined in relation to the uppersides and undersides of the shim plate. More precisely, the surface 31 leans obliquely downward/outward from the upperside while forming a moderate obtuse angle with the same. In practice, the obtuse angle may be within the range of 90.5-92°.

In contrast to the primary contact surface 31, in this case the secondary contact surface 32 extends perpendicularly to the plane of the shim plate.

Figure 13:
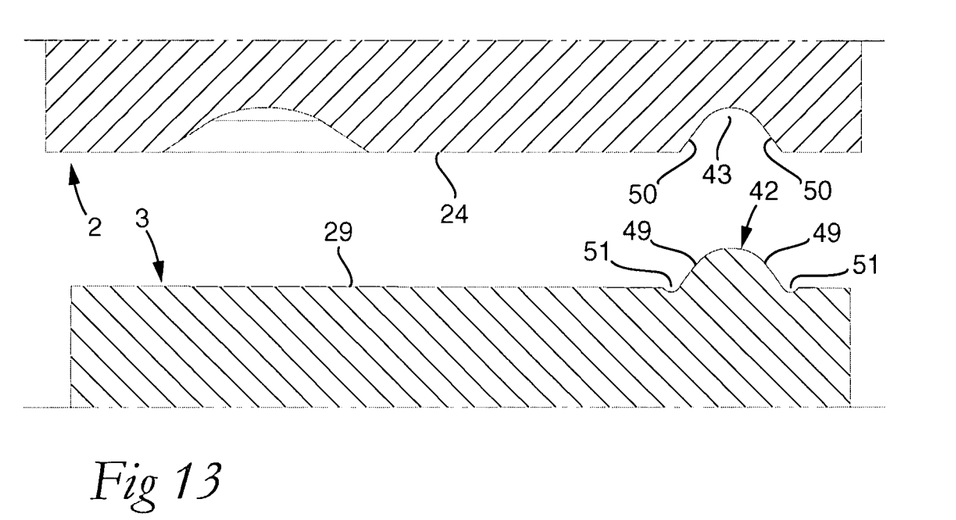
FIG. 13 is an analogous section in which the turning insert and the shim plate have been separated from each other.

As is seen in FIG. 13, the two opposite flanks 49 of the ridge 42 in the shown embodiment are made with a slightly convex shape. Simultaneously, the opposite, internal flanks 50 in the co-operating groove 43 are plane. Immediately next to the ridge 42, two shallow chutes 51 are formed, which form clearances adjacent to the ridge. The ridge does not touch the bottom of the groove.

According to a preferred embodiment of the invention, the depth of the groove 43 (equalling the situation of the contact flanks 50 in relation to the underside of the turning insert) is smaller than the height of the ridge 42 (equalling the situation of the flanks 49 in relation to the upperside 29 of the shim plate) such that a gap 52 (see FIG. 12) is formed adjacent to the ridge/groove. This gap 52 tapers wedge-shapedly toward a contact area designated 53 where the active corner section of the turning insert abuts against the free, outer corner section of the shim plate. In practice, the maximum height of the gap 52 in the vicinity of the ridge may be within the range of 0.05-0.25 mm, and for instance, amount to approximately 0.1 mm.

Figure 12:
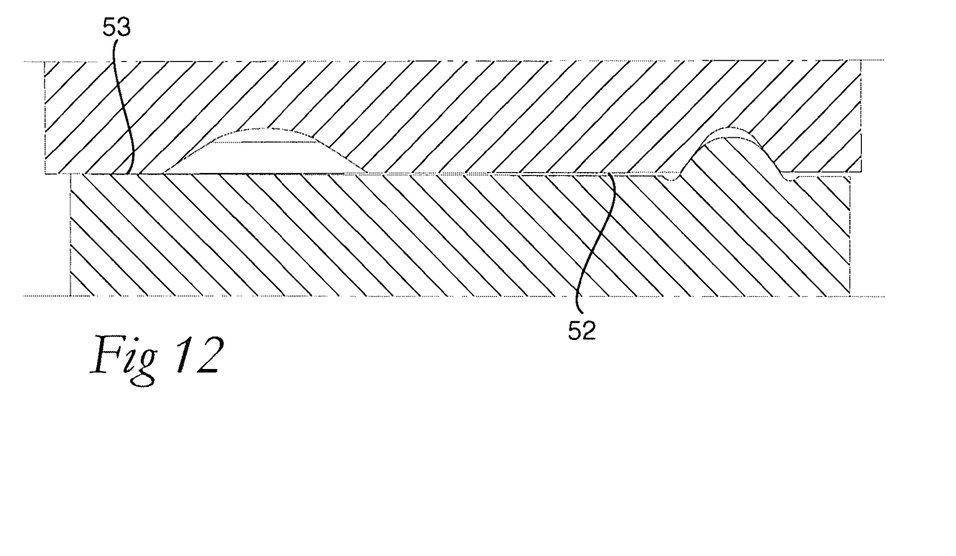
FIG. 12 is an enlarged detailed section showing the interface between the underside of the turning insert and the upperside of the shim plate.

By the fact that the ridge and the groove are the only actively co-operating engagement members in the interface between the turning insert and the shim plate, it is ensured, due to the gap 52, that possible form defects of the turning insert and the shim plate, respectively, will not cause unforeseeable stresses on the turning insert. Thus, the turning insert will obtain a reliable support along the most exposed part thereof, viz. the active corner section. Simultaneously, the co-operation of the groove with the ridge ensures that the turning insert cannot be turned in relation to the shim plate. If dimensional variations would be present between different turning inserts, in particular directly pressed turning inserts, the same are accommodated as a consequence of the fact that the female flanks 50 of the groove can slide along the male flanks 49 of ridge, without the rotary locking capability of the ridge/groove being impaired.

As is seen in, for instance, FIG. 7, each individual groove 43 extends unbroken between two opposite side surfaces 25 of the turning insert, the groove ending in openings 54. In an analogous way, the ridge 42 extends unbroken between two opposite side surfaces of the shim plate, viz. the primary contact surface 31 and the outer side limiting surface 34.

The screw 4 having the purpose of fixing the turning insert is, in a conventional way, manufactured from steel, and has therefore a certain inherent elasticity. Upon the final tightening of the screw, this elasticity is utilized to apply a lateral force to the turning insert, which aims to press the turning insert against the side support surface 16. For this purpose, the center axis C1 of the screw hole and the center axis C3 of the turning insert are eccentrically displaced in relation to each other, so far that the distance between center axis C1 and the support surface 16 is somewhat smaller than the distance between the center axis C3 and the active side surface 25 of the turning insert. In practice, the distance difference may be about some tenth of a millimeter. The effect of the mutual displacement of the center axes becomes that the screw is deflected elastically during the final phase of the tightening thereof, the head of the screw pressing the turning insert toward the side support surface 16. The direction of the tightening force is determined by the fact that an imaginary plane (not shown), which is common to the center axes C1, C3, is located parallel to the active groove 43 in the turning insert. In other words, the force is directed parallel to the straight groove that is guided along the ridge 42.

In accordance with an embodiment of the invention, the secondary side support surface 13 for the shim plate is formed on a lug 55, which in other respects is delimited by a top surface 56, an outer end surface 57, as well as a chamfer surface 58. The angle ε between the side support surfaces 12 and 13 should be as large as the angle γ between the contact surfaces 31, 32 of the shim plate (although moderate angle differences are acceptable). When the turning insert is mounted in the upper space above the shim plate, the lug 55 is located under the turning insert and can in such a way offer support to the secondary contact surface 32 of the shim plate 3, in spite of the wedge angle γ of the nose 44 being considerably smaller than the 60° corner of the turning insert.

In this connection, it should be pointed out that the wedge-shaped part 59 of the basic body projecting up from the upperside 56 of the lug has the purpose of protecting the cutting tooth of the turning insert not being indexed forward, which at present is located in the clearance space 20. In other words, the turning insert is not in contact with the inside of the wedge part 59.

When the basic body 1 is to be equipped to form a complete turning tool, the shim plate 3 is first applied. This is effected by the tightening screw 5, the head of which partially is urged against the shoulder surface 35 of the shim plate. Tightening of the screw entails that the primary contact surface 31 of the shim plate is displaced along the primary side support surface 12 in the basic body, more precisely until the secondary contact surface 32 contacts the secondary side support surface 13 of the lug 55. During the final phase of the tightening, the nose 44 of the shim plate is stably wedged up in the wedge-shapedly tapering space between the side support surfaces 12 and 13. During the fixation operation, a downwardly directed force will also be applied to the shim plate as a consequence of the fact that the contact surface 31 is inclined downward/outward in the previously described way and co-operates with the upward/inward inclined side support surface 12. In this connection, it should be mentioned that the angles of inclination of the surfaces 12, 31 do not need to correspond with each other. Thus, the surface 31 may be inclined somewhat steeper than the surface 12, whereby contact between the surfaces, at least initially, is established only along the upper portions of the surfaces (the contact may successively propagate downwardly after coining of the material of the basic body).

The transition surface 45 of the shim plate (at least initially) does not have contact with the end surface 57 of the lug 55. In other words, the inner end position of the shim plate is determined by the maximal force by which the tightening screw 5 can wedge up the nose 44 of the plate in the wedge-shaped space between the side support surfaces 12, 13.

In the mounted state thereof, the shim plate remains semi-permanent, so far that several exchanges of turning inserts can take place without the shim plate being removed from the pocket. The choice of shim plate is determined by the desired tilt angle of the teeth of the turning insert.

In the next step, the turning insert is mounted on top of the shim plate. This is effected simply by the fact that the turning insert is let down with a desired groove located along the ridge 42, and then the screw 4 is tightened in the female thread of the hole 38. During the final phase of the tightening of the screw 4, not only a downwardly directed tightening force, but also a lateral tightening force, is applied to the turning insert, which presses the chosen side surface 25 against the upper side support surface 16 in the basic body. By the fact that the surface 16 is slightly inclined in the direction downward/outward at the same time as the side surface 25 forms a 90° angle with the underside 24 of the turning insert, the contact between the surfaces (at least initially) is established only along the upper portions of the surfaces.

An advantage of the turning tool according to the invention is that the turning insert is fixed in a stable and reliable way so that the same can resist, among other things, such alternately arising forces that aim to turn the turning insert sometimes clockwise and sometimes counter-clockwise around the tightening screw. As a consequence of the co-operating male and female members in the interface between the turning insert and the shim plate providing a desired rotary locking of the turning insert, the active side support surface for the turning insert can be given a length that is considerably reduced in relation to the corresponding side support surface in related art tools. Thus, the primary side support surface in the tool according to the invention only serves as a stop for the turning insert. This means that also the co-operating side contact surface of the turning insert can be made with moderate length (LS). In such a way, a comparatively large space (length LT) can be utilized for the formation of the teeth of the turning insert. Since also the shim plate is kept fixed in a reliable way, due to the limited wedge angle of the nose, it is ensured that the turning insert carried by the plate is not dislodged in relation to the basic body. By manufacturing-technically very simple ways, viz. the ridge and the grooves in the interface, as well as the nose of the shim plate in combination with the reduced wedge angle of the side support surfaces, a turning tool is therefore obtained having the necessary qualities to generate dimensionally accurate threads.

The invention is not limited only to the embodiments described above and shown in FIGS. 6-14. Thus, the invention is applicable to any turning tool of the type that makes use of shim plates in combination with indexable, triangular turning inserts. In other words, at the three corners thereof, the turning inserts can be formed with traditional, round noses instead of teeth for the thread turning. Furthermore, it is possible to make the interface between the turning insert and the shim plate in such a way that the turning insert does not rest against any side support surface in the basic body. However, this would require a more complicated combination of male and female members, and therefore the simple interface, described above, is preferred in practice. Furthermore, a side support surface for the turning insert could be formed in the shim plate instead of in the basic body. Neither the ridge nor the grooves in the interface described need to extend unbroken all the way between opposite side surfaces of the shim plate and the turning insert, respectively. Thus, for instance, the ridge could be replaced by a plurality of knobs of limited length situated in a line one after the other. However, for reasons of manufacturing technique, the exemplified, unbroken ridge is preferred. As regards the individual groove, the length thereof could be reduced by the fact that the groove is terminated without mouthing in the side surfaces of the turning insert. In addition, the flanks of the groove may be convex and the flanks of the ridge be plane. Furthermore, the fixation of the turning insert as well as the shim plate may be effected by other tightening elements than screws, e.g., clamps, wedges or the like. Also, the turning insert may be made invertable by being formed with three engagement members on the underside as well as the upperside. Although it is preferred to provide the turning insert with female-shaped engagement members (in the form of grooves) and the shim plate with a male-shaped member, also the opposite alternative is possible. In other words, the turning insert could be formed with three alternately usable ridges and the shim plate with one active groove. However, in such cases, the shim plate would need to be supplemented with two wide grooves in order to accommodate the two inactive ridges of the turning insert.

The described tool can be utilized for chasing not only by the fact that the workpiece is rotated in relation to the tool in order to bring about the requisite relative motion, but also in the reversed way, i.e., by rotation of the tool in relation to a non-rotating workpiece (irrespective of whether the workpiece or the tool is axially fed).

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A turning tool comprising:
   a basic body having a pocket;
   a shim plate mounted in the pocket; and
   an indexable turning insert mounted in the pocket;
   the pocket opening in a front surface and in a side surface of the basic body, and accommodating two spaces spaced-apart level-wise, a lower space housing the shim plate and delimited by a bottom surface and two side support surfaces, which form an acute angle with each other, one of which is a primary side support surface and the other one a secondary side support surface, and an upper space housing the turning insert;

the shim plate including an upperside and an underside between which a pair of primary and secondary contact surfaces extend, which form an acute angle with each other and are urged against the primary and secondary side support surfaces in the pocket, as well as a pair of inactive surfaces extend in the form of an outer end surface and an outer side limiting surface, which together delimit a supporting corner section of the shim plate;

the turning insert having a triangular basic shape and including an upperside, an underside resting against the upperside of the shim plate, and three side surfaces that are situated in a first imaginary, equilateral triangle and therefore converge in pairs at an angle of 60° toward corners in which cutting edges are included; and first and second tightening elements being arranged to detachably fix the shim plate and the turning insert individually;

wherein the secondary side support surface of the pocket is formed on a lug having a top surface situated under the turning insert;

wherein respective acute angles (ε, γ) between the primary and secondary side support surfaces of the pocket, and the primary and secondary contact surfaces of the shim plate, are smaller than 60°; and wherein the underside of the turning insert and the upperside of the shim plate are engaged with each other via an interface that includes female-like and male-like engagement members, which are in engagement with each other to prevent turning of the turning insert.

2. The turning tool according to claim 1, wherein the acute angles (ε, γ) are at most 50°.

3. The turning tool according to claim 1, wherein the acute angles (ε, γ) are at least 25°.

4. The turning tool according to claim 1, wherein a transverse transition surface in the shim plate separates the secondary contact surface from the outer side limiting surface.

5. The turning tool according to claim 1, wherein an inner end surface extends between the two contact surfaces of the shim plate and forms an obtuse angle with the primary contact surface.

6. The turning tool according to claim 1, wherein the upperside of the shim plate includes a single active engagement member, which is spaced-apart from the supporting corner section of the shim plate, and is in engagement with one of three engagement members that are included in the turning insert and that are located in a second, imaginary triangle having an equilateral shape, which is smaller than the first imaginary triangle and rotated in relation to the first imaginary triangle, two active engagement members preventing turning of the turning insert and preventing rectilinear displacement of the turning insert in the direction perpendicular to the length extension of the active engagement members, but allowing rectilinear displacement of the turning insert parallel to the length extension of the active engagement members toward an upper side support surface.

7. The turning tool according to claim 1, wherein the depth of the female-shaped engagement member is smaller than the height of the male-shaped engagement member such that a gap is formed between the underside of the turning insert and the upperside of the shim plate, the gap tapering wedge-shapedly toward the supporting corner section where the turning insert contacts the upperside of the shim plate.

8. The turning tool according to claim 6, wherein the engagement member of the shim plate is a straight ridge and the three engagement members of the turning insert are straight grooves.

9. The turning tool according to claim 8, wherein plane flanks of the groove abut against convex flanks of the ridge.

10. The turning tool according to claim 8, wherein the ridge extends unbroken between the primary contact surface of the shim plate and the outer side limiting surface of the shim plate, and the groove extends unbroken between end openings in two opposite side surfaces of the turning insert.

11. The turning tool according to claim 1, wherein the tightening element for the fixation of the turning insert is a screw, which extends through through holes in the turning insert and the shim plate, and includes a male thread, which is in engagement with a female thread in a hole, which mouths in the bottom surface of the pocket, a center axis of the hole which mouths in the bottom surface of the pocket and an analogous center axis of the hole of the turning insert being eccentrically displaced in relation to each other to, upon tightening of the screw, apply a lateral force to the turning insert, which is parallel to the engagement members.

12. A shim plate for turning tools, comprising: an upperside and an underside between which a pair of primary and secondary contact surfaces extend, which form an acute angle with each other, as well as a pair of inactive side surfaces extend in the form of an outer end surface and an outer side limiting surface, which together delimit a supporting corner section, wherein an acute angle (γ) between the two contact surfaces is smaller than 60°, wherein an inner end surface extends between the two contact surfaces and forms an obtuse angle with the primary contact surface.

13. The shim plate according to claim 12, wherein the acute angle (γ) is at most 50°.

14. The shim plate according to claim 12, wherein the acute angle (γ) is at least 25°.

15. The shim plate according to claim 12, wherein a transverse transition surface separates the secondary contact surface from the outer side limiting surface.

16. The shim plate according to claim 12, wherein the upperside includes a single elongate and straight, male-like or female-like engagement member, which is spaced-apart from the supporting corner section.

17. The shim plate according to claim 16, wherein the engagement member is a ridge having two opposite flanks.

18. The shim plate according to claim 17, wherein the flanks are convex.

19. The shim plate according to claim 17, wherein the ridge extends at an angle within the range of 50°-90° to the primary contact surface.

* * * * *